(12) United States Patent
Ito

(10) Patent No.: US 8,089,204 B2
(45) Date of Patent: Jan. 3, 2012

(54) DISPLAY PANEL, DISPLAY AND IMAGE DISPLAY APPARATUS

(75) Inventor: Nobuhiro Ito, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 12/833,212

(22) Filed: Jul. 9, 2010

(65) Prior Publication Data

US 2011/0043698 A1    Feb. 24, 2011

(30) Foreign Application Priority Data

Aug. 24, 2009 (JP) .................. 2009-193359

(51) Int. Cl.
*H01J 19/42* (2006.01)
(52) U.S. Cl. ...................................... 313/292
(58) Field of Classification Search .......... 313/495–497, 313/294, 422; 427/76; 345/76; 445/24
See application file for complete search history.

(56) References Cited

U.S. PATENT DOCUMENTS

| | | | |
|---|---|---|---|
| 4,088,920 A * | 5/1978 | Siekanowicz et al. ........ 313/422 |
| 5,985,067 A * | 11/1999 | Schmid et al. ............. 156/89.16 |
| 6,049,165 A | 4/2000 | Spindt et al. |
| 6,157,123 A * | 12/2000 | Schmid et al. ............. 313/422 |
| 6,420,824 B1 * | 7/2002 | Abe et al. .................. 313/495 |
| 6,489,718 B1 * | 12/2002 | Schmid et al. ............. 313/495 |
| 6,791,255 B1 * | 9/2004 | Derouin et al. ............. 313/495 |
| 6,803,717 B2 * | 10/2004 | Ohnishi ..................... 313/495 |
| 7,446,468 B2 * | 11/2008 | Hong et al. ................. 313/495 |
| 2002/0084997 A1 | 7/2002 | Ohnishi |
| 2004/0245916 A1 | 12/2004 | Hiroike et al. |
| 2005/0007009 A1 * | 1/2005 | Ohnishi ..................... 313/495 |

FOREIGN PATENT DOCUMENTS

JP   2006-196451 A   7/2006

* cited by examiner

*Primary Examiner* — Peter Macchiarolo
(74) *Attorney, Agent, or Firm* — Fitzpatrick, Cella, Harper & Scinto

(57) ABSTRACT

An electric resistor element is provided outside of the image region. The electric resistor element and a potential regulating element are connected outside of the image region. A part of a surface of a front substrate other than a surface thereof opposite to the rear substrate and a part of a surface of a rear substrate other than a surface thereof opposite to the front substrate are connected by a high thermal conducting member. The electric resistor element is disposed between the part of the surface of the front substrate, which is connected to the part of the surface of the rear substrate by the high thermal conducting member, and the part of the surface of the rear substrate, which is connected to the part of the surface of the front substrate by the high thermal conducting member.

5 Claims, 5 Drawing Sheets

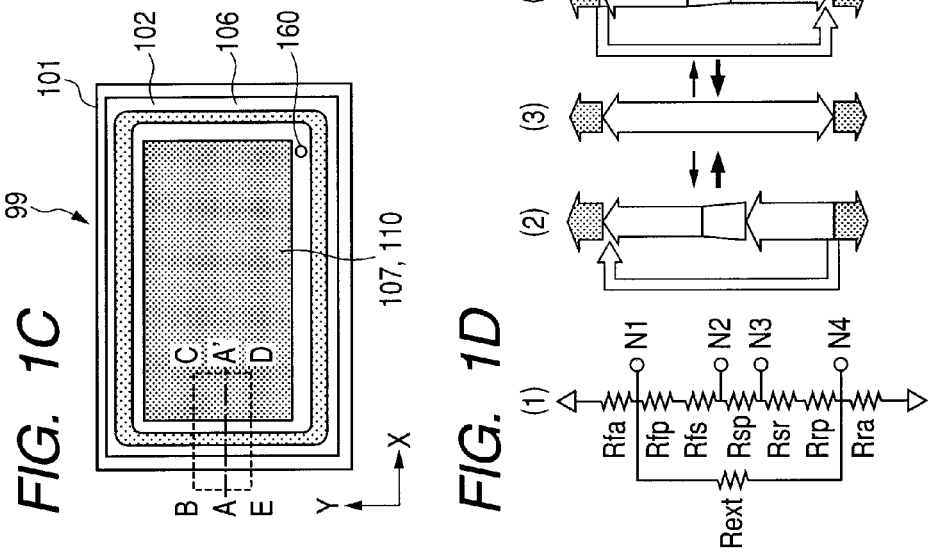
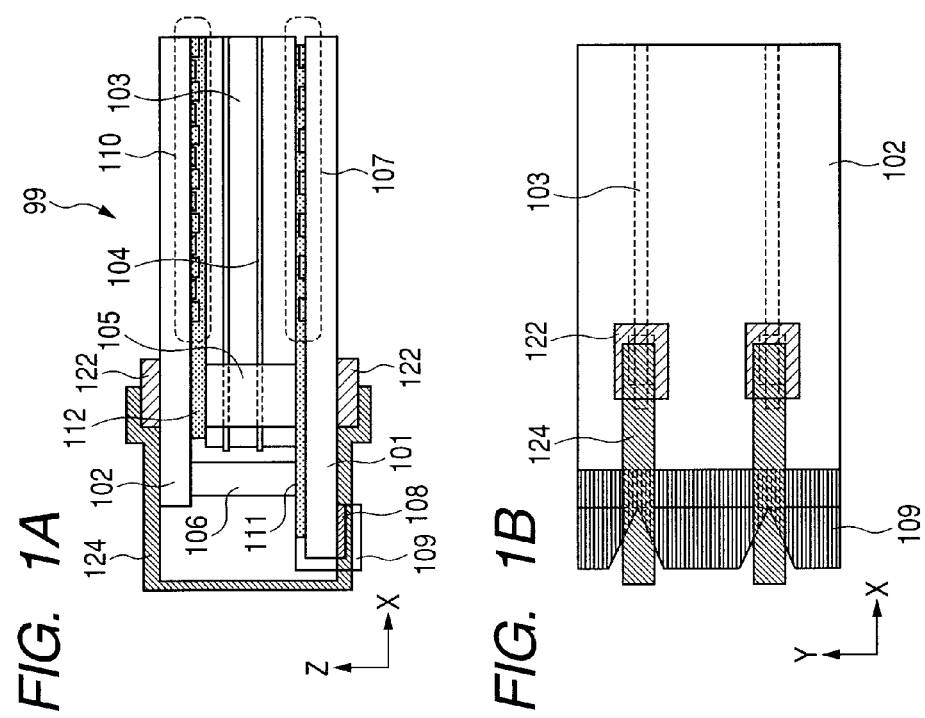

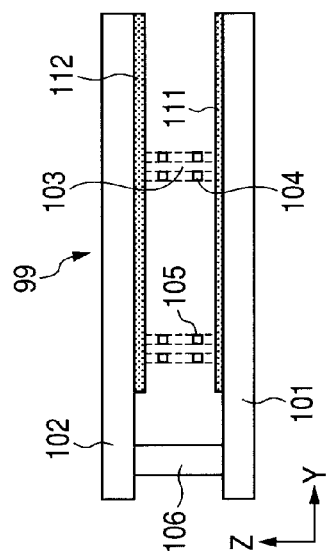
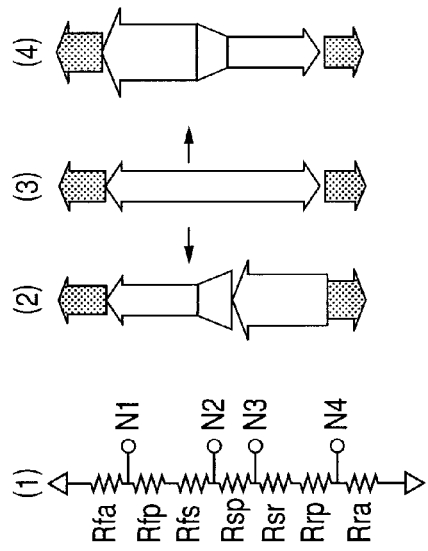
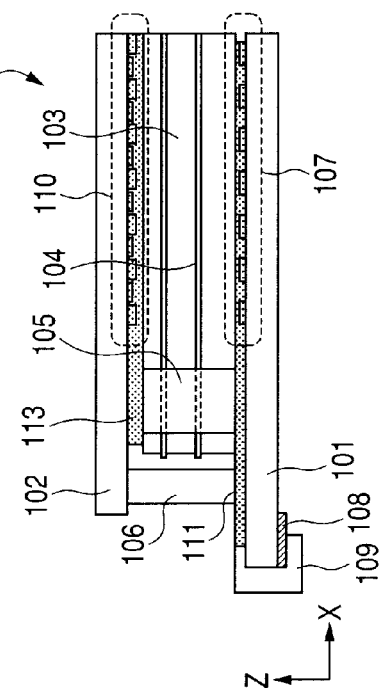
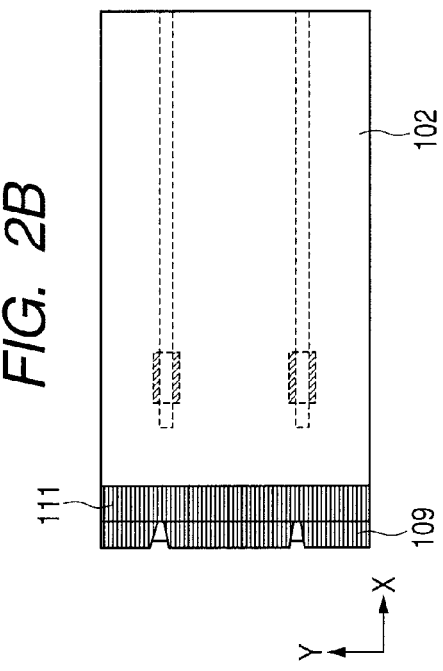

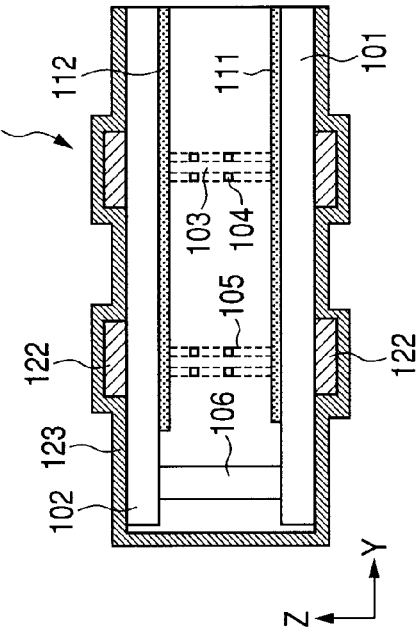
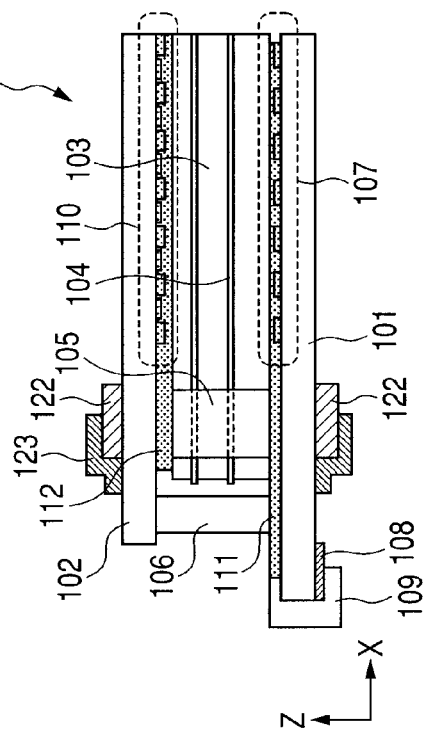
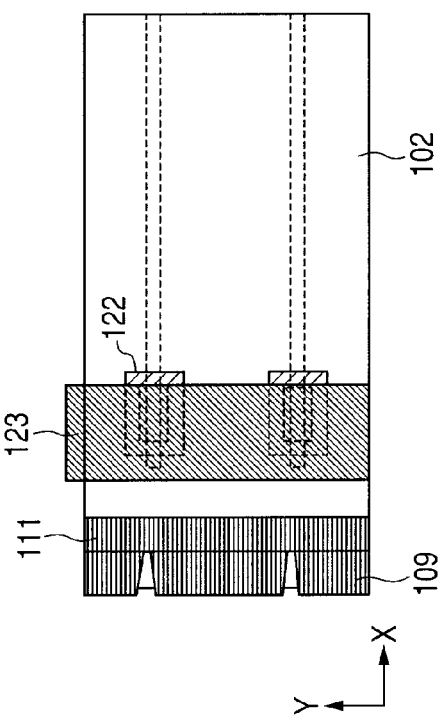

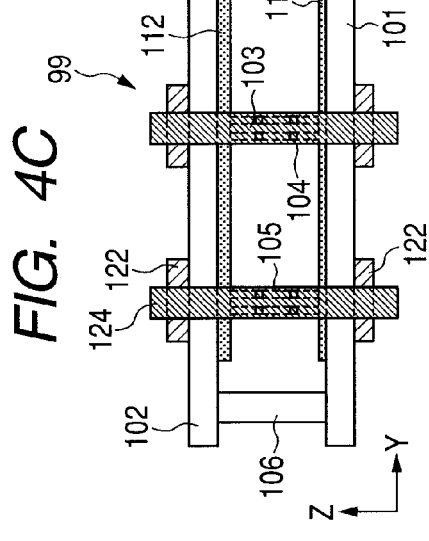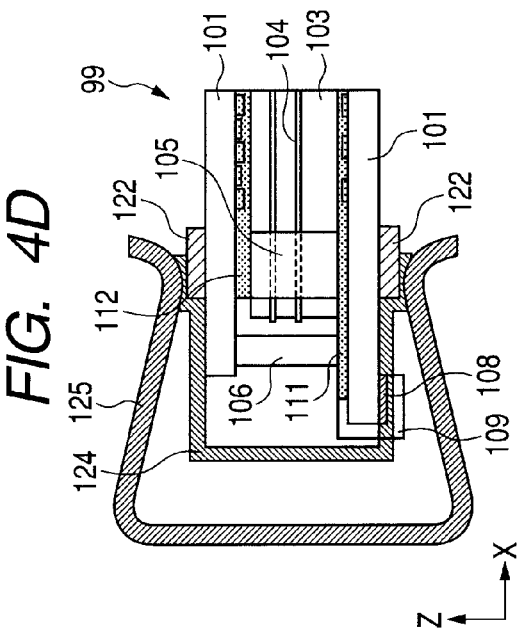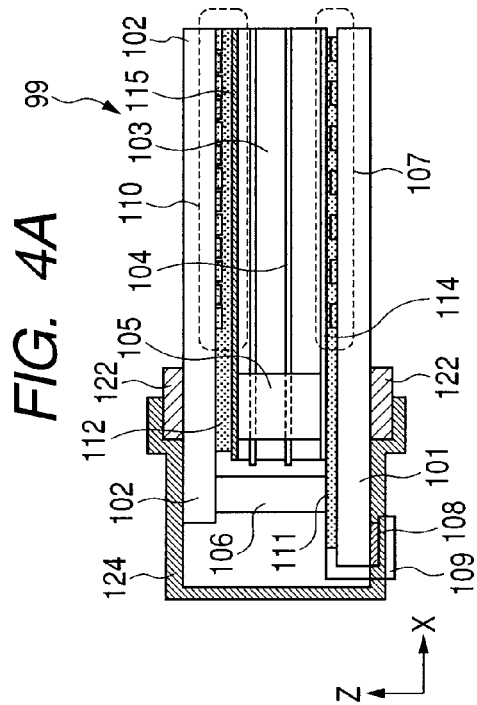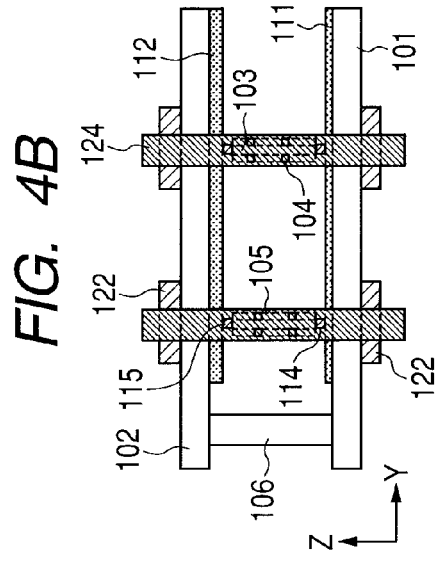

FIG. 5

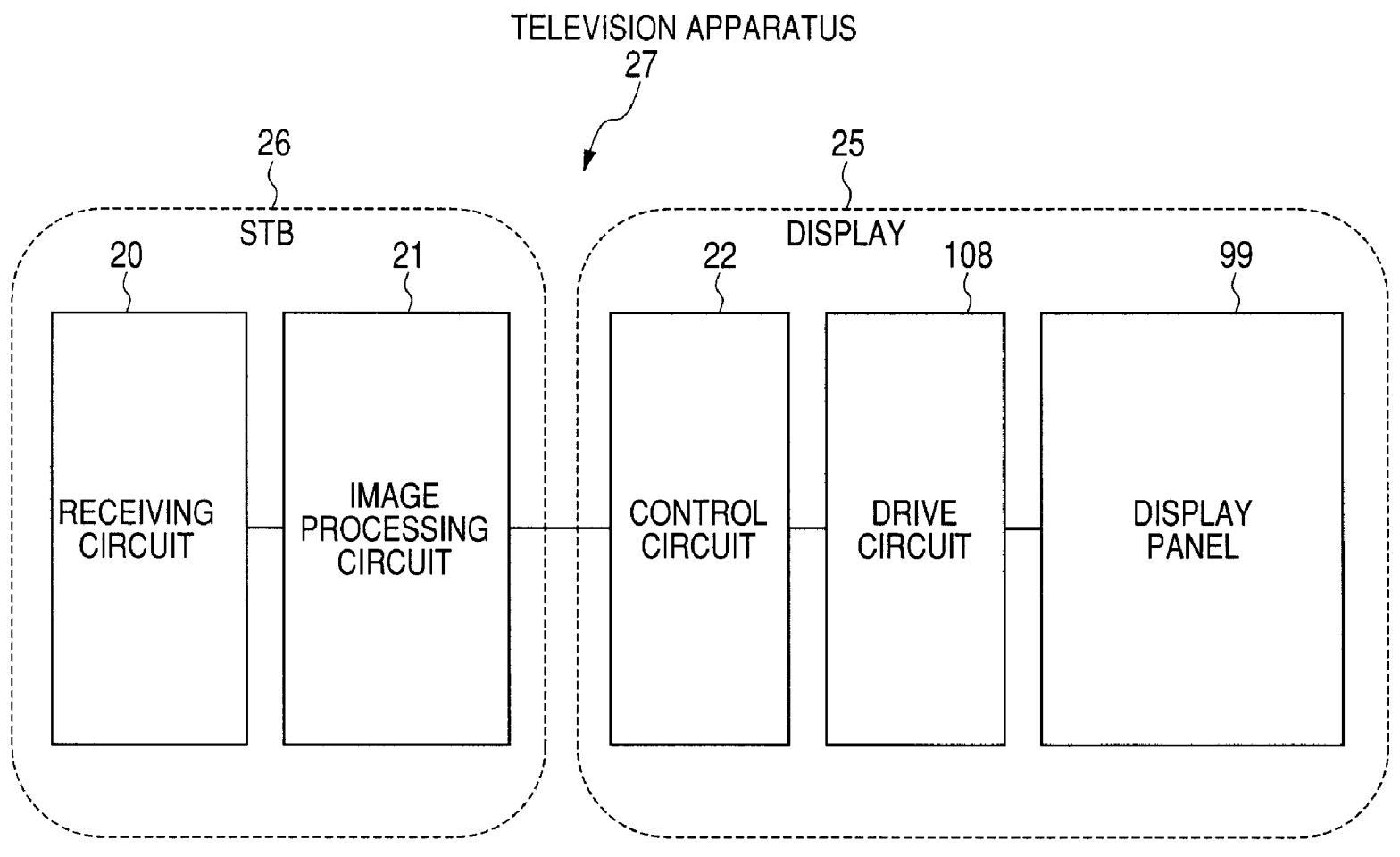

TELEVISION APPARATUS 27

STB 26
- RECEIVING CIRCUIT 20
- IMAGE PROCESSING CIRCUIT 21

DISPLAY 25
- CONTROL CIRCUIT 22
- DRIVE CIRCUIT 108
- DISPLAY PANEL 99

DISPLAY PANEL, DISPLAY AND IMAGE DISPLAY APPARATUS

BACKGROUND OF THE INVENTION

1. Field of the Invention

The present invention relates to a display panel having a spacer. In particular, the present invention relates to an electron beam-excited display panel, a display using the same, and a television apparatus and an image display apparatus.

2. Description of the Related Art

CRTs (cathode-ray tubes), VFDs (fluorescent display tubes) and FEDs (field emission type displays) are known as displays (electron beam-excited displays) including electron-emitting sources. These displays include a hermetically sealed container whose inner space is maintained at pressures below atmospheric pressure (vacuum) from the standpoint of keeping the mean free path of electrons emitted from an electron-emitting area in an electron-emitting element. A hermetically sealed container provided in the VFD or FED includes a front substrate including an anode provided with a plurality of light-emitting elements and anode electrodes; a rear substrate including a cathode provided with a plurality of electron-emitting elements corresponding to the light-emitting element; and a plurality of spacers arranged between the rear substrate and the front substrate. Accordingly, the hermetically sealed containers are made to be in a plate shape; the plate-shaped hermetically sealed containers of the VFD and FED are referred to as display panels.

U.S. Pat. No. 6,049,165 discloses semiconducting electric resistors arranged at a portion at the spacer and outside of an image region, and surface electrodes extending from the image region of the spacer to the outside of the image region and connected to the electric resistors. This configuration intends to define a desired potential where a voltage between the anode and the cathode is resistive-divided as a surface potential in the image region of the spacer, and to alleviate a deflection of trajectories of electric beams.

U.S. Pat. No. 7,446,468 discloses a connection between the front and rear substrates by a high thermal conducting member. Japanese Patent Application Laid-Open No. 2006-196451 discloses that interposition of a thermal resistor at abutment portions of the spacer with the anode and the cathode suppresses a difference in temperature at the electric resistor portion of the spacer.

SUMMARY OF THE INVENTION

According to the configuration of the U.S. Pat. No. 6,049,165, in operation of the display (in displaying an image), an influence on the electric resistor owing to a temperature distribution caused in the display panel may deflect the trajectories of electron beams.

Since the electric resistor is semiconducting, the electric resistance is generally represented by a function of temperature T. More specifically, the electric resistance of the electric resistor is the Arrhenius-activated form $R(T)=R_0 \exp(eEa/kT)$, where $R_0$ is the resistance at 0 degrees in absolute temperature. The spacer abuts against or is connected to the front and rear substrates. Accordingly, when an undesirable temperature distribution occurs at the display panel, the electric resistance of the electric resistor varies and in turn the potential of the surface electrode connected to the electric resistor also varies. As a result, a potential distribution on the surface of the spacer between the anode and the cathode (between the front and rear substrates) is changed from a prescribed distribution, an electric field distribution around the spacer is changed, thereby deflecting the trajectories of electron beams (this will be described later in detail).

Factors for occurrence of the temperature distribution include, for instance, generation of heat at a drive circuit disposed around the display panel, because the electric resistor of the spacer is disposed outside of the image region. The factor is not limited to the drive circuit. Instead, with respect to other factors, for instance, generation of heat caused by a non-effective power component of an electron-emitting source, a light-emitting element and drive wiring may be exemplified. The amounts of such generation of heat may differ between a front substrate side and a rear substrate side or differ according to the position of the display panel. Accordingly, a temperature distribution may occur between a plurality of spacers or in an electric resistor of one spacer.

It is an object of the present invention to provide a display suppressing the deflection of the trajectories of electron beams in operation of the display.

In order to achieve the above object, the present invention provides a display panel comprising: a rear substrate on which a cathode is disposed, the cathode having an electron-emitting area in which a plurality of electron-emitting elements is located; a front substrate on which an anode is disposed, the anode having a light-emitting area in which a plurality of light-emitting elements is located; a plurality of plate shape spacers disposed between the rear substrate and the front substrate, each of the plurality of plate shape spacers comprising an electric resistor element and a potential regulating element connected to the electric resistor element; a frame disposed between the rear substrate and the front substrate, and surrounding the plurality of plate shape spacers; and a thermal conducting member having higher thermal conductance rather than those of the front and rear substrates, wherein an inner space surrounded by the rear substrate, the front substrate and the frame is maintained at a pressure lower than atmospheric pressure, the electron-emitting area and the light-emitting area are disposed in opposition to each other in the inner space, and each of the plurality of plate shape spacers extends from a first region between the electron-emitting area and the light-emitting area in the inner space to a second region outside of the first region in the inner space, and the electric resistor element is disposed in the second region and is connected to the cathode and the anode, and the potential regulating element is disposed in the first region along a longitudinal direction of the plate shape spacer and is spaced from the cathode and the anode, a part of a surface of the front substrate opposite to a surface thereof facing the rear substrate is connected to a part of a surface of the rear substrate opposite to a surface thereof facing the front substrate, through the thermal conducting member, and the electric resistor element is disposed between the part of the surface of the rear substrate and the part of the surface of the front substrate.

The temperature distribution occurring at the display panel in operation of the display (in displaying an image) is alleviated. This alleviation can suppress the deflection of the trajectories of electron beams.

Further features of the present invention will become apparent from the following description of exemplary embodiments with reference to the attached drawings.

BRIEF DESCRIPTION OF THE DRAWINGS

FIGS. 1A, 1B and 1C are schematic diagrams of a display panel; FIG. 1D is heat transfer model diagrams.

FIGS. 2A, 2B and 2C are schematic diagrams of a display panel; FIG. 2D is heat transfer model diagrams.

FIGS. 3A, 3B and 3C are schematic diagrams of a display panel having another configuration and a heat transfer model diagram.

FIGS. 4A, 4B, 4C and 4D are schematic diagrams of a display panel having another configuration and a heat transfer model diagram.

FIG. 5 is a block diagram of an image display apparatus.

DESCRIPTION OF THE EMBODIMENTS

Preferred embodiments of the present invention will now be described in detail in accordance with the accompanying drawings.

A display (image display apparatus) of the present invention is a so-called flat panel display including a plate-shaped display panel (hermetically sealed container). The inner space of the display panel is provided with at least an electron-emitting element, a light-emitting element that is excited and emits light by irradiation by electrons emitted from the electron-emitting element, and a spacer.

First, a configuration of the display panel 99 will be described with reference to FIGS. 1A, 1B, 1C and 4C. Subsequently, a high thermal conducting member 124 will be described with reference to FIGS. 2A to 2D and FIG. 1D. Note that elements with the same symbols denote the same elements.

FIG. 1A schematically illustrates a sectional view of the display panel 99 around an electric resistor element 105 of a spacer 103. FIG. 1B schematically illustrates a plan view around the electric resistor element 105 of the spacer 103. FIG. 1C schematically illustrates a plan view of the display panel 99 as a whole; a sectional view thereof taken along an A-A' line is FIG. 1A; a plan view of a part enclosed by B-C-D-E is FIG. 1B. Note that FIG. 1C schematically illustrates so as to represent a frame 106. FIG. 4C is a schematic diagram in a case where a part of the display panel 99 is laterally viewed from the left of FIG. 1A.

The display panel 99 includes rectangular front and rear substrates 102 and 101, the frame 106 provided between the front and rear substrates 102 and 101, and a plurality of plate-like spacers 103 disposed between the front and rear substrates 102 and 101. The frame 106 has a rectangular frame shape in planar view, and hermetically seals the front and rear substrate 102 and 101. The thicknesses of the front and rear substrates 102 and 101 are practically 0.7 mm or more and 3.0 mm or less. If the thickness is too small, a deformation of the display panel (hermetically sealed container) owing to the air pressure difference between inside and outside thereof is increased. The deformation raises a concern about reliability as the hermetically sealed container. If the thickness is too large, a problem on increase in weight occurs. The frame 106 encloses the space between the front and rear substrates 102 and 101, thereby defining the inner space of the display panel 99. Thus, the inner space can be referred to as a space enclosed by the front and rear substrates 102 and 101 and the frame 106. In the inner space, the front and rear substrates 102 and 101 are oppositely disposed so as to be spaced from each other by a prescribed separation. The space between the front and rear substrates 102 and 101 in the inner space is, for instance, maintained to be 200 μm or more and 3 mm or less. More practically, the space is maintained to be 1 mm or more and 2 mm or less. In the inner space, the space between the front and rear substrates 102 and 101 can be regarded as an average height of the spacer 103. The inner space is maintained at pressures below atmospheric pressure (vacuum).

The electron-emitting element provided in the inner space of the display panel 99 includes the Spindt-type, MIM-type, BSD-type, surface-conduction type, carbon nanotube-type (hereinafter referred to as CNT-type) and heat cathode filament. In particular, the field emission-type electron-emitting element can be used from the standpoint of operating temperature characteristics of the spacer. That is, the display of the present invention can be applied to the FED (field emission type display).

A glass substrate, a ceramic substrate and a Si substrate can be used for the rear substrate 101. In particular, the rear substrate 101 made of glass substrate can be applied in view of matching of coefficient of linear expansion with the front substrate 102 requiring transparency. Further, the high-melting-point glass, alkali-free glass or the like can be applied from the standpoint of stability against process temperature.

A cathode 111 is provided on a surface of the rear substrate 101 opposite to the front substrate 102, and has an electron-emitting area 107. The electron-emitting area 107 is provided with the above-mentioned electron-emitting elements. Note that the electron-emitting area 107 is disposed at the inner space of the display panel 99. The cathode 111 also includes wirings connected to the electron-emitting elements in order to selectively drive the respective electron-emitting elements. Further, the cathode 111 may include a potential regulating member such as antistatic film that is disposed in the inner space of the display panel and electrically connected to the wirings and the electron-emitting elements.

In other words, in a broad sense, the cathode 111 is a member that is provided on a surface of the rear substrate 101 opposite to the front substrate 102, disposed in the inner space of the display panel 99 and defined at sufficiently lower potential than the anode 112. In a narrow sense, the cathode 111 means a conductive member abutting on or connected to the spacer 103 among notions of the cathode 111 in the broad sense. Note that the portion abutting or connected to the anode 112 in the spacer 103 can be referred to as an "FP side abutment portion". The abutment or connection between the spacer 103 and the anode 112 electrically connects the electric resistor element 105 of the spacer 103 and the anode 112. The electric resistor element 105 of the spacer 103 may directly abut or be connected to the anode 112. However, a configuration may be adopted that provides an after-mentioned abutment portion electrode (114 and 115) at the "FP side abutment portion" of the spacer 103 and electrically connects the electric resistor element 105 and the anode 112 via the abutment portion electrode.

The wirings connected to the electron-emitting elements are matrix wirings arranged in a matrix manner on the rear substrate 101. The electron-emitting elements can be arranged at or adjacent to respective intersections of the matrix wirings. This arrangement is to enable the cost to be reduced, and to realize an impulse-type display apparatus by means of sequential illumination of light-emitting element in a line-by-line manner. The wirings connected to the electron-emitting elements are connected to an after-mentioned drive circuit 108. The connecting configuration between the wirings and the drive circuit 108 is not particularly limited. For instance, a configuration can be adopted where leads connecting the inner space and the external space of the display panel through the frame 106 and the rear substrate 101 are provided and the wirings connected to the electron-emitting elements and the drive circuit 108 are connected to each other through the leads 109. Alternatively, another configuration can be adopted, where the wirings connected to the electron-emitting elements are extended to the external space of the display panel through the frame 106 and the rear substrate 101.

Another configuration can also be adopted that connects the drive circuit 108 and the wirings, which are connected to the electron-emitting elements, to each other in the external space of the display panel by means of a flexible cable.

The potential of the cathode 111 in operation of the display is maintained sufficiently low in comparison with the potential of the anode. More specifically, the potential is defined as ground potential or potentials near ground potential.

Materials for typical drive wirings such as Au, Ag, Cu and Al can be applied to the materials of the wirings connected to the electron-emitting elements.

The front substrate 102 is a glass substrate such as a quartz substrate or high-melting-point glass. The front substrate 102 can match in coefficient of linear expansion with the rear substrate 101 from the standpoint of relaxation of stress of the display panel. Further, the front substrate 102 can adopt the same material as that of the rear substrate 101.

The anode 112 is formed on the front substrate 102. The anode 112 is provided on a surface of the front substrate 102 facing the rear substrate 101 so as to be able to apply an anode potential for accelerating electrons emitted from the electron-emitting area 107. The anode 112 is disposed in the inner space of the display panel.

The anode 112 is provided on the surface of the front substrate 102 opposite to the rear substrate 101, and includes a light-emitting area 110. Note that the light-emitting area 110 is disposed in the inner space of the display panel. A plurality of light-emitting elements and anode electrodes are provided in the light-emitting area 110. Each light-emitting element emits light by being irradiated by electrons emitted from the plurality of electron-emitting elements included in the electron-emitting area 107. Note that the light-emitting area 110 generates heat by being irradiated by the electrons. When color images are displayed, the light-emitting elements may include light-emitting elements emitting red light, light-emitting elements emitting blue light and light-emitting elements emitting green light. Each light-emitting element can typically include a fluorescent material. The light-emitting elements are provided at least as many as display pixels of the display panel. For instance, the number of display pixels may be 1020 in the vertical direction (Y direction) and 1920 the in horizontal direction (X direction). In this case, the light-emitting elements are provided at least as many as 1020× 1920. Further, when the display image is a color image, at least three light-emitting elements, which emit colors of light (e.g., red, blue and green) different from each other, are required for a pixel. Accordingly, the light-emitting elements are provided at least as many as 1020×1920×3. Therefore, the light-emitting area 110 substantially corresponds to a region on the front substrate 102 on which an image of the display panel is displayed. Likewise, the electron-emitting area 107 can be regarded as a region on the rear substrate 101 opposite to the light-emitting area 110. Note that a configuration where the electron-emitting elements included in the electron-emitting area 107 can be provided at least as many as the display pixels (the number of pixels) of the display panel can also be adopted. Further, the electron-emitting elements can be provided as many as the light-emitting elements. One or more electron-emitting elements can be assigned to a light-emitting element.

The anode electrodes included in the anode 112 can be a conductive film. When the anode electrodes are provided for the light-emitting element on a side thereof facing the rear substrate 101, the anode electrodes can be, for instance, an aluminum film (so-called metal backing). When the anode electrodes are provided between the light-emitting element and the front substrate 102, the anode electrodes can be, for instance, a transparent conductive film such as an ITO film. Further, the anode 112 may include a getter film provided at the metal backing facing the rear substrate 101.

In other words, in a broad sense, the anode 112 means a member that is provided on the surface of the front substrate 102 opposite to the rear substrate 101 and is defined at sufficiently higher potential than that of the cathode 111 disposed in the inner space of the display panel. In a narrow sense, the anode 112 means a conductive member abutting or connected to the spacer 103 among notions of the anode 112 in the broad sense. Note that the portion abutting or connected to the cathode 111 of the spacer 103 can be referred to as "RP side abutment portion". The abutment or connection between the spacer 103 and the cathode 111 electrically connects the electric resistor element 105 of the spacer 103 and the cathode 111. The electric resistor element 105 of the spacer 103 may directly abut or be connected to the cathode 111. However, a configuration may be adopted that provides an after-mentioned abutment portion electrode (114 and 115) at the "RP side abutment portion" of the spacer 103 and electrically connects the electric resistor element 105 and the cathode 111 via the abutment portion electrode.

Note that the potential difference between the anode 112 and the cathode 111 vary to some extent according to the space between the front and rear substrates 102 and 101 and a light-emitting luminance required for the display image; for instance, the potential difference is maintained between 10 to 15 kV.

The "image region" of the present invention can be a region (a first region) that is disposed in the inner space of the display panel 99 and includes the light-emitting area 110, the electron-emitting area 107, and a region (space) sandwiched by the light-emitting area 110 and the electron-emitting area 107. The "outside of the image region" of the present invention can be a region (a second region) disposed in the inner space of the display panel 99, and a region (space) disposed out of the "image region". In other words, the "outside of the image region" is a region disposed in the inner space of the display panel 99, and a region (space) between the "image region" and the frame 106. The "outside of the image region" is a circular region viewed from the front substrate 102.

The material of the frame 106 may be a glass material or ceramics material, in view of structural strength, low degassing properties and hermeticity. In particular, the same material as that of the rear and front substrates can be used concerning the matching of coefficient of linear expansion in view of a stress design of the entire display panel.

The spacer 103 is provided in the inner space of the display panel 99, disposed between the rear and front substrates 101 and 102, and defines the space between both substrates. The base material of the spacer 103 may be a glass material or ceramics material, in view of structural strength, low degassing properties and hermeticity. In particular, the same material as that of the rear and front substrates can be used concerning the matching of coefficient of linear expansion in view of a stress design of the entire display panel 99.

The spacer 103 can have a plate-like shape, and cross the "image region"; opposite ends thereof in the longitudinal direction (opposite ends in X direction) can be disposed in the "outside of the image region". Note that at least one end in the longitudinal direction may be disposed in the "outside of the image region". That is, the spacer 103 is provided so as to extend from the "image region" to the "outside of the image region".

In the examples illustrated in FIGS. 1A to 1D, the plurality of spacers 103 is provided such that the longitudinal directions thereof are disposed in X direction and parallel to each other and spaced from each other by a prescribed separation in Y direction. First, the spacer 103 is fixed to any one of the front and rear substrates 102 and 101. Subsequently, the other substrate is assembled into the display panel. Accordingly, the spacer 103 can abut or be connected to the anode and the cathode of both substrates. Further, evacuation is performed after the assembly into the panel until the inner space of the display panel reaches pressures below atmospheric pressure (vacuum). Accordingly, the atmospheric pressure load enables fixation between the spacer 103 and both substrates to be secured in a further reliable manner.

The spacer 103 includes at least a potential regulating element 104 and an electric resistor element 105 provided on a side of the spacer 103. More specifically, the spacer 103 includes: a spacer base material made of an electrically insulating or dielectric material; the potential regulating element 104; and the electric resistor element 105. The potential regulating element 104 and the electric resistor element 105 are provided on the side of the spacer base material. Note that terms "electrically insulating" and "dielectric" are generally applicable to materials having resistivity equal to or more than $10^{12} \Omega \cdot cm$. As illustrated in FIG. 1A, the "side" indicates a surface (X-Z surface) exposed or opposite to the inner space of the display panel 99. Accordingly, each spacer 103 includes two sides opposite to each other.

The potential regulating element 104 is a conductor or a semiconductor, at least provided in the above-mentioned "image region", and connected to the electric resistor element 105. The potential regulating element 104 can have a configuration continuously extending from the "image region" to the "outside of the image region". The potential regulating element 104 extends along the longitudinal direction of the plate-like spacer (X direction), and is provided so as to be spaced from the anode 112 and the cathode 111. In FIG. 1A, the example where the two potential regulating elements 104 are linearly provided between the anode 112 and the cathode 111. However, the number of the elements is not limited thereto. The potential regulating element 104 is provided on at least one of the two sides of each spacer. In addition to Al, Cu and W capable of being used as so-called electrodes, metal oxides such as ITO and ruthenium oxide and a thick film paste material can be used as the potential regulating element 104. The resistance of the potential regulating element can appropriately be selected in relation to the resistance of the electric resistor element 105 and the resistance of the base material of the spacer 103. The potential regulating element 104 can alternatively be referred to as a potential regulating electrode.

The spacer 103 can further include abutment portion electrodes 114 and 115, as illustrated in FIGS. 4A and 4B. The abutment portion electrodes 114 and 115 are conductive or semiconductive electrodes that are formed at the abutment portion (FP side abutment portion) of the spacer 103 abutting to the anode 112 of the front substrate 102 and at the abutment portion (RP side abutment portion) of the rear substrate 101 abutting to the cathode 111. Metallic materials such as Al, Cu and W, metal oxides such as ITO and ruthenium oxide and a thick film paste material can be applied to the abutment portion electrodes 114 and 115. In particular, a load higher than or equal to atmospheric pressure is applied to the abutment portion. Accordingly, metallic materials capable of elastic and plastic deformation can be applied in the standpoint of electric contact and relaxation of stress.

The electric resistor element 105 may be a semiconductor or a resistor. The electric resistor element 105 is provided at a position disposed on the side of the spacer 103 and in the "outside of the image region" so as to connect the anode 112 and the cathode 111 to each other, and connected to the potential regulating element 104. Accordingly, the electric resistor element 105 extends along Z direction in FIGS. 1A to 1D (direction in which the anode 112 and cathode 111 are opposite to each other). Note that the electric resistor element 105 is provided in the "outside of the image region". A configuration where a part of the element is disposed in the "image region" may be adopted. The electric resistor element 105 is connected to the above-mentioned potential regulating element 104. The electric resistor element 105 and the potential regulating element 104 can be connected in the "outside of the image region". However, the elements may be connected in the "image region". Further, the electric resistor element 105 and the potential regulating element 104 can be connected to each other at a boundary between the "outside of the image region" and the "image region".

When the abutment portion electrode is provided, the abutment portion electrode is also connected to the electric resistor element 105. The position at which the electric resistor element 105 is formed can be a portion of the spacer 103 disposed in the "outside of the image region", in view of insusceptibility to variation in the resistance owing to electron beams in the "image region". Further, the electric resistor element 105 may be formed at one side or both sides of the spacer 103. In particular, the element can be formed at opposite ends of the spacer base material in the longitudinal direction (X direction) and on both sides thereof from the standpoint of the potential regulating performance. This configuration enables the potential of the potential regulating element 104 to be defined as a prescribed potential between the potentials of the anode 112 and the cathode 111. This configuration enables the potential in the vertical direction of a portion of the spacer 103 disposed in the "image region" to be defined.

Note that the longitudinal, vertical and thickness directions mean the left and right direction (X direction), up and down direction (Z direction) and perpendicular direction (Y direction), as illustrated in FIGS. 1A to 1C.

The electric resistor element 105 can be stacked and formed on the spacer base material. Bulk of resistors can be formed by connection on the spacer base material. Thin films of transition metal oxide and transition metal nitride, and complexes where transition metal oxide or transition metal nitride is dispersed into insulative ceramics or glass matrix, can be used as the electric resistor element 105. However, a resistor thin film formed by dispersing Au into aluminum oxynitride can be used in consideration of suppression of temperature dependence of the resistance. Typical methods of making a resistor can be applied to a method of forming the electric resistor element 105. A sputtering film formation method, an evaporation method and an ink jet formation method can also be used therefor. Patterning by excimer laser trimming can be performed as necessary.

The drive circuit 108 is connected to the wirings connected to the electron-emitting elements through the leads 109 at an outer surface of the display panel (out of the frame 106). In particular, a narrower frame of the display panel is required in view of industrial design. Accordingly, the drive circuit 108 can be mounted on a printed circuit board (not illustrated), and disposed in a peripheral region of the display panel on the rear surface (the surface opposite the surface facing the front substrate 102) of the rear substrate 101. Note that the "peripheral region" here can be regarded as a region arranged outside of a region surrounded by the frame 106 viewing the display panel from the rear substrate 101. The drive circuit 108 may directly be fixed on the rear surface of the rear substrate 101. Instead the drive circuit 108 may be fixed to the rear surface of the rear substrate 101 via a support member for supporting the drive circuit 108. Further, the drive circuit 108 may be fixed to the rear surface of the rear substrate 101 sandwiching a small gap with the rear surface of the rear substrate 101. In each case, the drive circuit 108 thermally contacts with the peripheral region of the display panel 99 on the rear surface of the rear substrate 101.

Next, the high thermal conducting member 124 will be described.

First, a display without the high thermal conducting member 124 will be described with reference to FIGS. 2A to 2D. Subsequently, a display with the high thermal conducting member 124 will be described with reference to FIGS. 1A to 1D.

FIGS. 2A, 2B and 2C schematically illustrate the display panel without the high thermal conducting member 124. FIG. 2A schematically illustrates a sectional view in X direction of the display panel 99 around the electric resistor element 105 of the spacer 103, as with FIG. 1A. FIG. 2B schematically illustrates a plan view around the electric resistor element 105 of the spacer 103, as with FIG. 1B. FIG. 2C schematically illustrates a sectional view in Y direction of the display panel 99. FIG. 2D illustrates an equivalent heat transfer model illustrating generation of a temperature distribution.

As illustrated in FIG. 2A, the spacer 103 includes the electric resistor element 105 and the potential regulating element 104. The electric resistor element 105 of the spacer 103 abuts or is connected to the cathode 111 and the anode 112. That is, the electric resistor element 105 connects to the rear and front substrates 101 and 102 via the cathode 111 and the anode 112.

Operation of the display having the configuration illustrated in FIGS. 2A to 2C may offer a problem of easy occurrence of the temperature distribution around the electric resistor element 105 of the spacer 103.

The drive circuit 108, the light-emitting area 110 and the electron-emitting area 107 are arranged around the electric resistor element 105. Since energy conversion efficiencies thereof are not 100%, non-effective power components are converted into heat. Further, Joule heat is generated at the wirings connected to the electron-emitting elements included in the cathodes 111 and the anode electrodes included in the anode 112. Thus, a heat source at the front substrate 102 is the anode 112; a heat source at the rear substrate 101 is the cathode 111. Note that a main factor of the heat source at the front substrate 102 is the light-emitting area 110. In a case where the drive circuit 108 is provided on the rear substrate 101, the main factor of the heat source at the rear substrate 101 is the drive circuit 108. Joule heat is also generated at the electric resistor element 105.

The generation of heat from the above-mentioned various heat sources is not necessarily the same between the front and rear substrates 102 and 101. Further, the generation of heat is not necessarily even in the front and rear substrates 102 and 101. Accordingly, when the display panel is driven, the difference of temperature occurs not only between the front and rear substrates 102 and 101 but also in different positions in the display panel. The difference may undesirably influence the spacer 103.

The influence of the heat generated from the above-mentioned various heat sources on the spacer 103 is dependent on image information to be displayed, and temporarily uneven. For instance, when an image signal for a display image with high luminance across the entire screen is applied to the display panel, an amount of generation of heat comparable to the amount of generation of heat from the image region concentratedly occurs around the drive circuit 108. Accordingly, the temperature of the electric resistor element 105 at the cathode 111 tends to be higher than the temperature of the electric resistor element at the anode 112.

A typical heat transfer model around the electric resistor element 105 will hereinafter be described with reference to FIG. 2D, as an example of a case where the drive circuit 108 is provided on the rear surface of the rear substrate 101 in the peripheral region of the display panel.

Note that, hereinafter, the heat generation of the drive circuit will mainly be described. However, as described above, another heat source of the display panel exists. A difference between the temperatures at the front and rear substrates 102 and 101 occurs according to the individual heat sources. Accordingly, the heat transfer model of FIG. 2D can be applied without limitation to a case where the drive circuit 108 is provided on the rear surface of the rear substrate 101 in the peripheral region of the display panel.

Here, Rfp and Rrp represent heat transfer thermal resistances in directions of thickness of the front and rear substrates 102 and 101, respectively. Rfs, Rsr represent contact thermal resistances of the abutment portions of the front and rear substrates 102 and 101 abutting on the spacer, respectively. Rsp represents a heat transfer resistance in the vertical direction around the electric resistor element 105 of the spacer 103. N1 and N4 represent panel heat flux nodes of the front and rear substrates, respectively. N2 and N3 represent spacer heat flux nodes of the FP and RP side abutment portions, respectively.

(3) in FIG. 2D illustrates a state (state with a desired temperature distribution) where the temperature distribution does not grow between the front and rear substrates 102 and 101 of the electric resistor element 105, as a stationary state.

On the other hand, (2) in FIG. 2D illustrates a state where heat infusion whose heat source is the drive circuit 108 is dominant at a node N4 at the rear substrate 101 and additionally, heat infusion whose heat source is the electric resistor element 105 of the spacer 103 exists between nodes N2 and N3. Here, thermal release to the outward direction viewing from the nodes N1 and N4 is restricted by the thermal release and convection heat transfer with the atmosphere (air) surrounding the display panel. Accordingly, the heat fluxes indicated by arrows are uneven, causing a bottleneck of heat flux at the node N4. As a result, a state as a transient phenomenon where the node N3 is at a high temperature with respect to the node N2 in the electric resistor element 105 can easily be maintained. The electric resistor element 105 generally has a negative resistance coefficient with regard to temperature. Accordingly, the nearer to the node N3, the lower the resistance of the electric resistor element 105 becomes. As a result, the potential of the potential regulating element 104 shifts so as to approach the potential of the cathode 111 with respect to a desired potential. The trajectories of the electron beams emitted from the electron-emitting elements near the spacer 103 deflect to a direction repelling from the spacer 103.

On the other hand, (4) in FIG. 2D illustrates a state where the front substrate 102 of the electric resistor element 105 is at a high temperature. More specifically, the figure illustrates a state where heat infusion whose heat source is the light-emitting area 110 is dominant at a node N2 at the front substrate 102 and additionally, heat infusion whose heat source is the electric resistor element 105 of the spacer exists between the nodes N2 and N3. This state is a case where a high luminance image is displayed on a peripheral part of a display screen and a low luminance image is displayed on the center part of the display screen. Such a heat flux distribution tends to appear, in a case where the generation of heat at the drive circuit 108 is restricted and the external quantum efficiency of the light-emitting element of the light-emitting area 110 is lower than that of the electron-emitting area 107. In such a case, in contrast to the case illustrated in (2) in FIG. 2D, the potential of the potential regulating element 104 shifts so as to approach the potential of the anode 112 with respect to the desired potential. The trajectories of the electron beams emitted from the electron-emitting elements near the spacer 103 deflect to a direction attracted to the spacer 103.

A region of the electric resistor element 105 abutting, directly connected or connected via an abutment portion electrode to the anode 112 is referred to as a region 1V. A region of the electric resistor element 105 abutting, directly connected or connected via an abutment portion electrode to the cathode 111 is referred to as a region 2V. The regions 1V and 2V are connected to each other by the high thermal conducting member 124.

A specific configuration example of the display of the present invention including the high thermal conducting member 124 will be illustrated with reference to FIGS. 1A, 1B and 4C. A function of the high thermal conducting member 124 will be described with reference to FIG. 1D.

Note that the above-mentioned "connection" does not mean a configuration where the regions 1V and 2V are directly connected to each other by the high thermal conducting member 124. That is, the regions 1V and 2V are coupled in a heat transferring manner via configuration members (the front and rear substrates 102 and 101, anode 112 and cathode 111) of the display panel. In other words, the regions 1V and 2V are coupled in a heat transferring manner so as to alleviate the difference in temperature on the front and rear surfaces (front and rear substrates 102 and 101) of the display panel around the electric resistor element 105 of the spacer 103.

In particular, as illustrated in FIGS. 1A, 1B and 4C, parts on surfaces (facing atmosphere) of the rear and front substrates 101 and 102 other than the surfaces facing the inner surface are connected by the high thermal conducting member 124. More specifically, connecting portions of the high thermal conducting member 124 to the rear and front substrates are arranged so as to cover at least a part of the surfaces facing atmosphere of the rear and front substrates 101 and 102 at the rear of the electric resistor element 105.

In other words, with respect to the connecting portion of the high thermal conducting member 124 to the rear substrate, the high thermal conducting member is provided on the surface (substrate facing atmosphere) of the rear substrate 101 on the reverse side of the surface opposite to the front substrate 102. Likewise, with respect to the connecting portion of the high thermal conducting member 124 to the front substrate, the high thermal conducting member is provided on the surface (substrate facing atmosphere) of the front substrate 102 on the reverse side of the surface opposite to the rear substrate 101. The electric resistor element 105 of the spacer is disposed between the connecting portions of the high thermal conducting member 124 to the rear and front substrates. In other words, the connecting portion of the high thermal conducting member 124 to the rear substrate and the connecting portion of the high thermal conducting member 124 to the front substrate are provided so as to sandwich the electric resistor element 105 of the spacer. Further, in other words, the regions 1V and 2V are disposed at a part of the high thermal conducting member 124 provided between the surface of the front substrate 102 facing atmosphere and another part of the high thermal conducting member 124 provided at the surface of the rear substrate 101 facing atmosphere.

That is, the region 1V and a part (region) of the high thermal conducting member 124 provided on a part (region) on the surface of the front substrate 102 facing atmosphere are opposed to each other, sandwiching the front substrate 102. Likewise, the region 2V and a part (region) of the high thermal conducting member 124 provided on a part (region) on the surface of the rear substrate 101 facing atmosphere are opposed to each other, sandwiching the rear substrate 101.

Note that larger footprints of parts provided on the surfaces of the rear and front substrates 101 and 102 facing atmosphere of the high thermal conducting member 124 (parts covering the surfaces facing atmosphere of the rear and front substrates 101 and 102) can be adopted.

Further, high thermal conductive connecting members 122 can be provided between the high thermal conducting member 124 and the rear substrate 101 and between the high thermal conducting member 124 and the front substrate 102, thereby increasing reliability of heat transferring coupling.

Note that the high thermal conducting member 124 may have thermal conductivity (heat transfer coefficient) higher than the rear and front substrates 101 and 102. More specifically, the high thermal conducting member 124 may include a material having higher thermal conductivity than that of the rear and front substrates 101 and 102. A so-called typical high thermal conducting member may be used as the high thermal conducting member 124. The thermal resistance of this member can be lower than that around the electric resistor element 105 of the spacer 103. Thermal conductors including precious metals such as Au, Ag or Cu, thermal conductors including at least sp3 bonded carbon material such as diamond-like carbon and diamond, and a heat pipe can be used as the high thermal conducting member 124. For the sake of reducing cost, for instance, Cu tape may be used. In view of performance of thermal uniformity, the heat pipe can be used.

For instance, high thermal conductivity adhesives (high thermal conductivity silicone rubber adhesive), high thermal conductivity pastes having Au particles or diamond particles dispersed therein, and phase change type high thermal conductivity sheets can be used as the high thermal conductive connecting member 122.

Further, the contact thermal resistance between the high thermal conducting member 124 and the rear substrate 101 and the contact thermal resistance between the high thermal conducting member 124 and the front substrate 102 can substantially be the same. The high thermal conductive connecting member 122 can be pressurized at the same area and compression bonding force between the front and rear substrates 102 and 101. For instance, as illustrated in FIG. 4D, the high thermal conducting member 124 and the high thermal conductive connecting member 122 can be pressurized by means of a pressurizing mechanism using an elastic clip 125. This procedure allows the thermal connection between the high thermal conducting member 124 and the high thermal conductive connecting member 122 to be satisfactory. At the same time, this procedure allows the heat transferring efficiency of the abutment portion between the high thermal conducting member 124 and the front and rear substrates 102 and 101 to be increased. This procedure thereby allows the heat transferring balances between the FP and RP side abutment portions to be substantially equivalent to each other. Although the elastic clip 125 is not particularly limited, an elastic clip of fine thermal conductivity metal, for instance Fe, can be used. Here, the example where the high thermal conductive connecting member 122 is provided is used. However, the advantageous effect by the elastic clip can be exerted in a case without the high thermal conductive connecting member 122.

Further, the high thermal conducting member 124 can short the heat transferring path. As illustrated in FIG. 1B, the regions 1V and 2V can be connected through a space in a flexible cable bundle of the leads 109.

Next, the function of the high thermal conducting member 124 will be described with reference to FIGS. 1A, 1B, and 1D. Note that the heat transferring model in FIG. 1D is not limited to a case where the drive circuit 108 is provided on the rear surface of the rear substrate 101 in the peripheral region of the display panel. That is, the heat transferring model in FIG. 1D can be applied even to a case where a difference occurs in temperature between the front and rear substrates 102 and 101 owing to the heat source other than the drive circuit 108.

(2) in FIG. 1D illustrates a case where the drive circuit 108 is the most dominant heat source around the electric resistor element 105 and additionally, heat infusion whose heat source is the electric resistor element 105 of the spacer exists between the nodes N2 and N3, as with (2) in FIG. 2D. Here, dominant heat infusion is from the heat source into the node N4 via the small thermal resistance Rext of the high thermal conducting member 124. However, in contrast to the case in (2) in FIG. 2D, a part of the heat fluxes is directly bypassed to the node N1 on the front substrate via the low thermal resistance Rext of the high thermal conducting member 124. As a result, amounts of heat of the nodes N1 and N4 are balanced. Asymmetry of the heat fluxes of the nodes N2 and N3 comes into a balanced state in comparison of the state in (2) in FIG. 2D. Therefore, the deflection of trajectories of the electron beams emitted from the electron-emitting element is alleviated in comparison with the state in (2) in FIG. 2D. Further, an allowance is created also for the thermal transferring performance at the nodes N1 and N4 to ambient atmosphere (air). Accordingly, the heat fluxes become difficult to accumulate. Therefore, an advantageous effect is exerted that restoring action from the state of the temperature distribution in (2) in FIG. 1D to the state of the desired temperature distribution illustrated in (3) in FIG. 1D becomes fast. Note that (3) in FIG. 1D illustrates a state (state of desired temperature distribution) where the temperature distribution does not grow between the front and rear substrates 102 and 101 of the electric resistor element 105, as a stationary state, as with (3) in FIG. 2D.

On the other hand, (4) in FIG. 1D illustrates a state where the side of the electric resistor element 105 facing the front substrate 102 is at a high temperature, as with (4) in FIG. 2D. More specifically, heat infusion whose heat source is the light-emitting area 110 into the node N2 at the front substrate is dominant. Additionally, the figure illustrates heat infusion between the nodes N2 and N3 whose heat source is the electric resistor element 105 of the spacer. In this state, the high luminance image is displayed on the peripheral part of the display screen and the low luminance image is displayed on the center part of the display screen, as with (4) in FIG. 2D. Even in this case, dominant heat infusion is from the heat source into the node N2 via the small thermal resistance Rext of the high thermal conducting member 124, as with (2) in FIG. 1D. In contrast to the case in (4) in FIG. 2D, a part of the heat fluxes are directly bypassed to the node N4 at the rear substrate via the low thermal resistance Rext of the high thermal conducting member 124. As a result, amounts of heat of the nodes N1 and N4 are balanced. Asymmetry of the heat fluxes of the nodes N2 and N3 comes into a balanced state in comparison of the state in (4) in FIG. 2D. Therefore, the deflection (in this case, in the direction of attraction to the spacer) of trajectories of the electron beams emitted from the electron-emitting element is alleviated in comparison with the state in (2) in FIG. 2D. Further, an allowance is created also for the thermal transferring performance at the nodes N1 and N4 with respect to ambient atmosphere (air). Accordingly, the heat fluxes become difficult to accumulate. Therefore, an advantageous effect is exerted that restoring action from the state of the temperature distribution in (4) in FIG. 1D to the state of the desired temperature distribution illustrated in (3) FIG. 1D becomes fast.

Note that, in the display panel 99 illustrated using FIGS. 1A, 1B and 4C, the high thermal conducting members 124 are separately provided to opposite ends in the longitudinal direction of one plate-like spacer 103. However, as illustrated in FIGS. 3A, 3B and 3C, a configuration can be adopted where the whole high thermal conducting members 124 are connected to each other. Further, a configuration can be adopted where some spacers are grouped and the high thermal conducting members 124 in each group are connected to each other. This configuration can reduce the difference in temperature between the spacers 103, in comparison with the states in FIGS. 1A to 1C.

Next, a display 25 including the above-mentioned display panel 99 and a television apparatus 27 will be described using a block diagram of FIG. 5.

A receiving circuit 20 includes a tuner and a decoder, receives a television signal such as satellite broadcasting and terrestrial television broadcasting, or data broadcasting via a network, and outputs decoded image data to an image processing circuit 21. The image processing circuit 21 includes a γ correction circuit, a resolution converting circuit and an I/F circuit, converts image-processed image data into a display format of the display 25, and outputs the image data to the display 25.

The display 25 includes at least the above-mentioned display panel 99. Further, the display 25 includes the drive circuit 108 and a control circuit 22 controlling the drive circuit. The control circuit 22 applies signal processing such as a correction process to the input image data, and outputs the image data and various control signals to the drive circuit 108. The control circuit 22 includes a synchronization signal separation circuit, an RGB conversion circuit, a luminance data converter and a timing control circuit. The drive circuit 108 outputs a drive signal to the electron-emitting element in the display panel 99 based on the input image data. A television image is displayed based on the drive signal. The drive circuit 108 includes a scanning circuit, a modulating circuit and a high-voltage power circuit providing the anode potential. The receiving circuit 20 and the image processing circuit 21 may be contained in a casing such as a set-top box (STB 26) other than the display 25. Instead, the receiving circuit 20 and the image processing circuit 21 may be contained in a casing integrally formed with the display 25. Here, the example where the television apparatus 27 displays the television image has been described. However, if the receiving circuit 20 is a circuit receiving images distributed via lines such as the Internet, the television apparatus 27 may function as an image display apparatus capable of displaying various images without limitation of only displaying the television image.

EXAMPLES

The present invention will hereinafter be described with reference to specific examples.

Example 1

This example is an example of making the display panel 99 including the high thermal conducting member 124 that connects the FP and RP side abutment portions of the electric resistor element 105 illustrated in FIGS. 1A to 1D in a heat transferring manner.

<Rear Substrate Making Process>

The rectangular rear substrate 101 (1000 mm in the horizontal direction×600 mm in the vertical direction×1.8 mm in thickness) including a glass substrate (PD200 manufactured by Asahi Glass Co., Ltd.) was prepared. Next, the rear substrate 101 was subjected to organic solvent cleaning, pure water rinse and UV-ozone cleaning, thereby degreasing the surface thereof.

One thousand and eighty row wirings extending in the horizontal direction (X direction) and 5760 column wirings extending in the vertical direction (Y direction) were arranged on a surface of the rear substrate 101 opposite to the front substrate 102. This arrangement thus formed the matrix wirings. Note that each wiring was formed mainly by Cu. In this example, 500 Spindt type electron-emitting elements were provided at the respective intersections of the matrix wirings.

A region where the electron-emitting elements are formed (electron-emitting area 107) is arranged in a rectangular region disposed 40 mm inside from each of four sides forming the perimeter of the rectangular rear substrate 101. That is, the horizontal length (in X direction in FIG. 1B) of the electron-emitting area 107 of the rear substrate 101 is 920 mm; and the vertical length (in Y direction in FIG. 1B) is 520 mm. Note that the row wirings and column wirings making up the matrix wirings was formed by extending the wirings from the region where the electron-emitting elements were formed to the outer region.

Next, a silicon oxide film, whose thickness was 1 μm, was formed by the plasma CVD method on a circular region with dimensions of 17 mm in width, which was disposed 10 mm inside from each of four sides forming the perimeter of the rectangular rear substrate 101. The silicon oxide film was formed as a base coat under a region applied with adhesive for fixing the after-mentioned frame 106 and the spacer 103 to the rear substrate 101.

Next, a print paste including amorphous glass frit manufactured by Asahi Glass Co., Ltd. was applied on the silicon oxide film using the screen printing method. Subsequently, the print paste was dried in an atmosphere dryer. The thickness of the glass frit left on the silicon oxide film after drying was 5 μm. The softening point of the glass frit is 353° C.; and the process temperature thereof is 430° C.

Next, as illustrated in FIG. 1C, a through hole with diameter of 5 mm for evacuating the inner space of the display panel was provided as an exhaust hole 160 at the rear substrate 101. Note that, as illustrated in FIG. 1C, the exhaust hole 160 was formed at a position inside of the display panel and outside of the image region.

The rear substrate 101 including the cathode 111 was formed according to the above procedure.

<Front Substrate Making Process>

The rectangular front substrate 102 (984 mm in the horizontal direction×584 mm in the vertical direction×1.8 mm in thickness) including a glass substrate (PD200 manufactured by Asahi Glass Co., Ltd.) was prepared. Next, the front substrate 102 was subjected to organic solvent cleaning, pure water rinse and UV-ozone cleaning, thereby degreasing the surface thereof. Note that the thermal conductivity of the glass used for this example at 60° C. is 0.98 (W/m/K).

The light-emitting area 110 including 1080 pixels in the vertical direction and 1920 pixels in the horizontal direction was formed on the surface of the front substrate 102 opposite to the rear substrate 101.

Each pixel includes three subpixels. The three subpixels are a subpixel emitting red (R) light, a subpixel emitting blue (B) light and a subpixel emitting green (G) light. Each subpixel was made of P22 fluorescent material. Black silicon carbide is formed between pixels and subpixels. An aluminum film with thickness of 100 nm was formed on the fluorescent material (on the side of the rear substrate 101). This film was a metal backing layer serving also as the anode electrode.

A region where the metal backing layer is formed (anode 112) is arranged in a rectangular region disposed 22 mm inside from each of four sides forming the perimeter of the rectangular front substrate 102. That is, the horizontal length (in X direction in FIG. 1B) of the anode 112 of the front substrate 102 is 940 mm; and the vertical length (in Y direction in FIG. 1B) is 540 mm. Note that the length of the light-emitting area 110 (region where the fluorescent material is formed) in the horizontal direction (in X direction in FIG. 1B) of the front substrate 102 is 918 mm; and the vertical length (in Y direction in FIG. 1B) is 516 mm. As described above, the front substrate 102 including the anode 112 was made.

<Frame Making Process>

A PD200 substrate with thickness of 1.5 mm manufactured by Asahi Glass Co., Ltd. is prepared. A rectangular member with dimensions of 976 mm in the horizontal direction×576 mm in the vertical direction×1.5 mm in thickness is cut out. Subsequently, a central region (968 mm in the horizontal direction×568 mm in the vertical direction×1.5 mm in thickness) of the rectangular member was hollowed by a cutting operation, and the frame 106 having a substantially rectangular section with dimensions of 5 mm in width and 1.5 mm in height was formed. Next, the frame 106 was subjected to organic solvent cleaning, pure water rinse and UV-ozone cleaning, and whereby the surface thereof was degreased, thus making the frame 106.

<Spacer Making Process>

The spacer 103 including the potential regulating element 104 and the electric resistor element 105 was made as follows.

The spacer base material was made using the heat drawing method where PD200 manufactured by Asahi Glass Co., Ltd. adopted as the base material. The dimensions of the spacer substrate were 954 mm in the horizontal direction (X direction), 0.15 mm in the vertical direction (Y direction) and 1.5 mm in the height direction (Z direction).

Sinusoidal projections and depressions with depth of 15 μm and pitch of 100 μm were formed on both surfaces of the side (surfaces of 954 mm×1.5 mm) of the spacer base material.

Next, abutment portion electrodes (not illustrated) and the potential regulating elements 104 were formed on the spacer base material by sputtering. The abutment portion electrodes were formed as a film with thickness of 100 nm of W on the bottom and top surfaces (surfaces with dimensions of 954 mm×0.15 mm) of the spacer base material. Two electrodes of W with width of 50 μm separated from each other by 0.5 mm were formed as the potential regulating element 104 on both surfaces (both surfaces of dimensions of 954 mm×1.5 mm) of the spacer base material by sputtering using a metallic mask.

Next, the electric resistor element 105 was formed into a prescribed shape by sputtering using a metallic mask on the spacer base material. The electric resistor element 105 was formed on both sides (both surfaces of dimensions of 954 mm×1.5 mm) of the spacer base material. On each side, the element was formed such that the width thereof extended by 5 mm in Z direction and the outer perimeter was disposed 9 mm inside of the opposite ends in the longitudinal direction (X direction). That is, the electric resistor elements 105 were to be formed at two points on a side of one spacer base material; and the electric resistor elements 105 were formed at a total of four points on the spacer base material. A film was formed as the electric resistor element 105, using a baked body of alloy of Au and Al as a sputtering target, and using nitrogen and oxygen as a carrier gas. The film-formed electric resistor element 105 was a polycrystalline AuAlON film. The range of the sheet resistances at 20-60° C. was $2\times10^{10}$ to $4\times10^{10} \Omega/\square$. As described above, 40 plate-like spacers have been made.

<Panel Forming Process>

The rear and front substrates 101 and 102, the frame 106 and the spacer 103 were assembled into the display panel, as described below.

The spacer 103 was aligned with the rear substrate 101, while a tension was applied thereto by a tension applier, which is not illustrated. The opposite ends of the spacer 103 was fixed on a silicon oxide preliminary formed around the rear substrate 101 using Aron ceramic D manufactured by Toagosei Co., Ltd. According to this configuration, the plate-like spacer 103 is provided across the image region of the display panel; the opposite ends of the plate-liken spacer 103 in the longitudinal direction are disposed outside of the image region of the display panel.

Next, the frame 106 preliminary provided with glass frit at the abutment portion with rear substrate 101 and the abutment portion with the front substrate 102 was mounted on the rear substrate 101 including the spacer 103. The front substrate 102 was placed on the frame 106 mounted on the rear substrate 101. The assembly process was thus performed. Subsequently, the assembled rear substrate 101, frame, 106 and front substrate 102 were fixed by a clip so as not to be misaligned with the relative positions thereof; in the atmosphere baking furnace, the glass frit on the abutment portions were melted and vitrificated. According to this process, the rear substrate 101, the frame 106 and the front substrate 102 were hermetically contacted, and the display panel inside of which had not been evacuated yet was acquired.

Next, the entire display panel was heated at 350° C. for 10 minutes, while the space between the rear and front substrates 101 and 102 (the inner space of the display panel) were evacuated through the exhaust hole 160. In a process of cooling the display panel to ambient temperature, the exhaust hole 160 was sealed with a glass lid made of PD200 and a joint member made of In, thereby acquiring the display panel 99 inside of which was maintained vacuum. Note that the electric resistor element 105 of the spacer 103 was arranged in a region 2 mm inside of the perimeter of the metal backing and 3 mm outside of the light-emitting area 110.

<Connection with Drive Circuit>

The scanning circuit and the modulating circuit included in the drive circuit 108 were connected to the four sides of the display panel 99 that had been made as described above via the flexible cable. Further, the high-voltage power circuit (included in the drive circuit 108) was connected to the anode.

<Connection of High Thermal Conductor>

In this Example 1, as illustrated in FIGS. 1A, 1B and 1C, copper foil with dimensions of vertical 10 mm×horizontal 8 mm×thickness of 0.7 mm was used as the high thermal conductive connecting member 122. Note that the thermal conductivity of the copper foil at 60° C. is 451 (W/m/K). This copper foil was cemented on the surfaces of the rear substrate 101 and front substrate facing atmosphere, using the thermal conductivity paste (phase change sheet PCS-TC-10 manufactured by Shin-Etsu Chemical Co., Ltd.), so as to be arranged immediately above the area where the electric resistor element 105 of the spacer 103 was disposed.

Further, as the high thermal conducting member 124, copper foil tape with adhesive (CU-35C manufactured by Sumitomo 3M Limited) was attached to the high thermal conductive connecting member 122, thereby thermally coupling regions of the abutment portions of the electric resistor element 105.

The width of the copper foil tape is 5 mm. The tape thermally couples the substrates 101 and 102 to each other so as to be inserted though the space of the flexible cable bundle. The above procedure was applied to each of the opposite ends of the 40 plate-like spacers 103. The display panel of this Example 1 was thus acquired.

An anode voltage of 10 kV was applied to the display panel of this Example 1 acquired by the above procedure. The electron-emitting elements were driven at vertical scanning frequencies of 60 Hz, and the image was displayed. There are two patterns of display images. A display image pattern 1 is an all white pattern for the whole pixels, vertical 1080×horizontal 1920. On the other hand, a display image pattern 2 is all white pattern for a vertical band of 200 pixels around opposite ends in the horizontal direction (total 400 pixels); and the residual 1520 pixels are displayed in all planar black. In other words, the display image pattern 2 indicates a pattern where vertically extending white display regions exist at the opposite ends from the standpoint of facing the screen.

The display panel was driven at ambient temperature of 24° C. with an image display according to the display image pattern 1 for 30 minutes. With respect to a difference in temperature between the nodes 1 and 4 near the electric resistor element 105, the node 3 was higher by 13° C. On the other hand, the display panel was driven with an image display according to the display image pattern 2 for 30 minutes. With respect to a difference in temperature between the nodes 1 and 4 near the electric resistor element 105, the node 1 was higher by 10° C.

On the other hand, a display panel of a comparative example 1 was made. The display panel of the comparative example 1 had the same configuration as that of the display panel 99 of this embodiment except that the high thermal conducting member 124 and the high thermal conductive connecting member 122 were not provided. The image was displayed according to the display image pattern 1 as with the Example 1. With respect to a difference in temperature between the nodes 1 and 4 of the display panel of the comparative example 1, the node 4 was higher by 25° C. Further the image was displayed according to the display image pattern 2. With respect to a difference in temperature between the nodes 1 and 4 near the electric resistor element 105, the node 1 was higher by 21° C.

As to the temperatures of the nodes 1 and 4, since the thermal conductivity of the copper foil tape is high, a value acquired by measuring a surface of the copper foil tape, which is high thermal conducting member 124, by an infrared thermoviewer can substantially be regarded as the temperatures of the node 1 and 4. More specifically, in the display panel of the Example 1, provided that the infrared emissivity of the copper foil of the high thermal conducting member 124 was {0.07}, the temperature of the surface of the copper foil tape was determined according to the infrared spectrum. Further, in the display panel of the comparative example 1, provided that the infrared emissivity of PD200 glass was {0.89}, the temperature was determined by infrared spectra of the atmosphere-side surfaces of the rear and front substrates 101 and 102 arranged immediately above the electric resistor element 105 of the spacer. Note that a method of measuring by a thermocouple can be adopted as the method of measuring the temperature on the atmosphere-side surfaces of the front and rear substrates 102 and 101.

The images were displayed according to display image patterns 1 and 2. Variation in position of a light emitting point (bright point) owing to deflection of trajectories of electron beams near the spacer 103 was measured. As a result, in the display panel of this Example 1, positional deviation of the light emitting point (bright point) was not found on the display image. On the other hand, in the display panel of the comparative example 1, a large positional deviation of the light emitting point (bright point) was recognized. The light emitting point (bright point) positional deviation was evaluated by comparing light emitting points (bright points) of five pixels from the pixel closest to the spacer 103 and light emitting points (bright points) of five pixels away from the spacer 103 at least by 10 pixels.

Example 2

In this example, a heat pipe that a wick and an alternative fluorocarbon were encapsulated in a hermetic pipe made of copper was used instead of the high thermal conducting member 124 of the Example 1. A high thermal conductive silicone adhesive manufactured by Shin-Etsu Chemical Co., Ltd. was used for connecting portions between the heat pipe and the high thermal conductive connecting member 122. The display was made such that other points were substantially identical to those of the Example 1. Further, the two types of image display patterns were displayed for 30 minutes, as with the Example 1. A degree of deviation, which might cause a problem in view of display image, of the light emitting point (bright point) was not identified, as with the Example 1. Further, the difference in temperature between the nodes 1 and 4 was capable of being reduced.

Example 3

In this example, a display panel was made as with Example 1 except that the copper foil tape as the high thermal conducting member 124 was directly cemented to the atmosphere-side surfaces of rear and front substrates 101 and 102 instead of the high thermal conductive connecting member 122 in Example 1. The two types of image display patterns were displayed on this display panel for 30 minutes, as with the Example 1. A degree of deviation, which might cause a problem in view of display image, of the light emitting point (bright point) was not identified, as with the Example 1, though not identical to the Example 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-193359, filed Aug. 24, 2009, which is hereby incorporated by reference herein in its entirety.

What is claimed is:

1. A display panel comprising:
a rear substrate on which a cathode is disposed, the cathode having an electron-emitting area in which a plurality of electron-emitting elements is located;
a front substrate on which an anode is disposed, the anode having a light-emitting area in which a plurality of light-emitting elements is located;
a plurality of plate shape spacers disposed between the rear substrate and the front substrate, each of the plurality of plate shape spacers comprising an electric resistor element and a potential regulating element connected to the electric resistor element;
a frame disposed between the rear substrate and the front substrate, and surrounding the plurality of plate shape spacers; and
a thermal conducting member having a higher thermal conductance than that of the front and rear substrates, wherein
an inner space surrounded by the rear substrate, the front substrate and the frame is maintained at a pressure lower than atmospheric pressure,
the electron-emitting area and the light-emitting area are disposed in opposition to each other in the inner space,
and each of the plurality of plate shape spacers extends from a first region between the electron-emitting area and the light-emitting area in the inner space to a second region outside of the first region in the inner space, and the electric resistor element is disposed in the second region and is connected to the cathode and the anode, and
the potential regulating element is disposed in the first region along a longitudinal direction of the plate shape spacer and is spaced from the cathode and the anode,
a part of a surface of the front substrate opposite to a surface thereof facing the rear substrate is connected to a part of a surface of the rear substrate opposite to a surface thereof facing the front substrate, through the thermal conducting member and
the electric resistor element is disposed between the part of the surface of the rear substrate and the part of the surface of the front substrate and outside of the first region between the electron-emitting area and the light-emitting area.

2. The display panel according to claim 1, wherein the thermal conducting member contains at least one selected from copper, diamond-like carbon, gold and silver.

3. The display panel according to claim 1, wherein the thermal conducting member is connected to the front and rear substrates through a thermally conducting sheet, a thermally conducting paste or a thermally conducting adhesive.

4. A display comprising:
a display panel according to claim 1; and
a drive circuit for driving the display panel, wherein the drive circuit is placed at a peripheral region of the display on a surface of the rear substrate at a side opposite to a surface of the rear substrate facing the front substrate.

5. An image display apparatus comprising:
a receiving circuit;
an image processing circuit; and
the display panel according to claim 1.

* * * * *